Dec. 3, 1968  A. V. HEEDE ETAL  3,414,649
DEVICE AND METHOD FOR MANUFACTURING
OF SPIRALS AND/OR RINGS
Filed Aug. 13, 1964
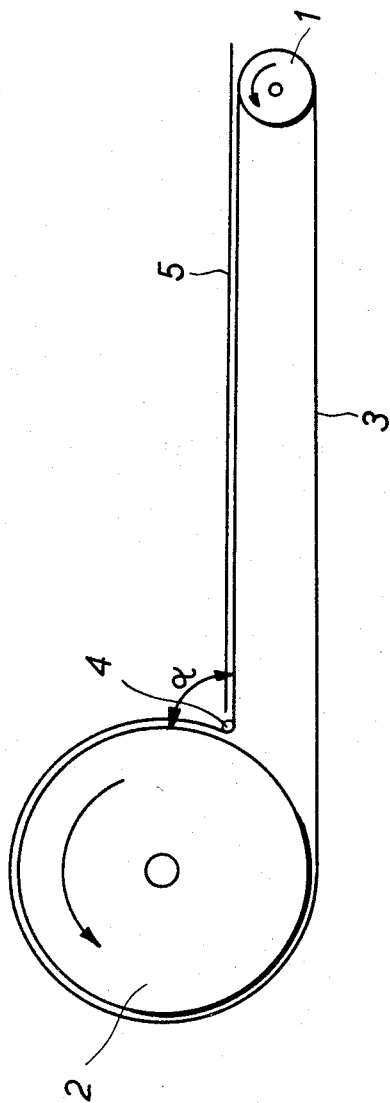
INVENTORS
ARNE VALMAR HEEDE
SVERRE FREDRIKSEN
TOR NOLDUS NILSEN
BY  Irwin S. Thompson
ATTORNEY

United States Patent Office 3,414,649
Patented Dec. 3, 1968

3,414,649
DEVICE AND METHOD FOR MANUFACTURING OF SPIRALS AND/OR RINGS
Arne Valmar Heede, Ivar Aasens vei 25D, Oslo, Norway; Sverre Fredriksen, Brudeberget, Drammen, Norway; and Tor Noldus Nilsen, Hannebjergvei 12, Rungsted Kyst, Denmark
Filed Aug. 13, 1964, Ser. No. 389,266
Claims priority, application Norway, Aug. 16, 1963, 149,755
4 Claims. (Cl. 264—297)

ABSTRACT OF THE DISCLOSURE

Spirals or rings are formed from lengths of sheet material by passing them on a conveyor belt that extends between and about two rolls and that passes beneath and is deflected by a spindle adjacent one roll. Upon passage beneath the spindle, the sheet material is stretched and deformed so that it takes a permanent arcuate set. The spindle may rotate with the belt and be decelerated relative to the belt to alter the curvature of the treated material along its length thereby to form a spiral. An inclined plate above the belt adjacent the spindle provides a discharge chute down which the formed rings or spirals can roll.

---

The invention relates to a device for manufacturing of spirals and/or rings from strips or webs of a relatively rigid, planar material, e.g. of paper, cardboard, prehardened impregnated paper, plastics, and the like.

It has been found that spirals and/or rings of the above mentioned, relatively rigid materials are well suited as inserts in e.g. composite plates or doors, where the spirals and/or rings, which preferably consist of prehardened, impregnated paper, are placed between two boards, plates or sheets, whereafter the entire product, possibly during evolution of heat, is compressed to form a unit, that may form a plate or door which is very resilient to stress and to pressure, and has only very little if any tendency to warp.

Thus, there has in the course of time become a continually higher demand for a device adapted for preparation of such spirals and/or rings, in an economical and rapid manner.

An object of the invention thus resides in providing such a device, and a method for its use, for producing spirals and/or rings from strips or webs of relatively stiff, planar material.

According to the invention this is achieved by providing a device which in a simple and economical manner applies, to said strips or webs of relatively rigid planar material, first a flexing action and second a stress action, so that a permanent deformation occurs, whereby the product is obtained in the form of spirals and/or rings.

Thus, the invention relates to a device for producing spirals and/or rings from strips or webs of relatively rigid planar material, e.g. paper, cardboard, prehardened impregnated paper, plastic materials, etc., and the device is characterised in that it comprises an endless band adapted to be moved over rollers and being guided by a stationary or rotatable spindle at one of the rollers, so that the band is guided between the spindle and the roller, forming an angle the apex of which is constituted by the spindle. The roller provided near the spindle is the roller having the largest diameter.

When the device of the invention is used for manufacturing of spirals and/or rings, the planar material strips or webs are placed upon the band in such manner that they are fed between the band and the spindle, whereby there are formed spirals and/or rings in that the material fed around the spindle is subjected both to a flexure and to a stretch, whereby the material is permanently deformed to spirals or rings. The device of the invention suitably is so arranged that the angle enclosed by the band is adjustable, the stress in the band being controllable, at the same time that the position of the spindle in relation to the most adjacent roller may be changed. This allows formation of spirals or rings of different diameters, since the material becomes subjected to a stronger deformation, when the angle enclosed by the band becomes less, so that spirals and/or rings of smaller diameters are formed.

In a preferred embodiment of the invention the rotation of the spindle may be braked, possibly periodically, whereby such braking takes place so that when the material strip or web is passed between the spindle and the band, the rotation of the spindle is braked as the formation of the spiral and/or the ring proceeds, whereby there is obtained a greater friction between the spindle and the material to be deformed, so that the deformation becomes more distinct at the end portion of the spiral or ring formation whereby the end of the spiral approaches closely to the material below.

By use of a profiled spindle there may be obtained certain desired effects, by providing the material, web or strip with sharp folding edge portions.

Below the invention is explained further with reference to the drawing, which diagrammatically shows a device according to the invention.

In the example shown the device comprises two rollers 1 and 2, over which extends an endless band 3. At the roller 2 having the larger diameter a spindle 4 guides the band in such manner that the band is guided between the spindle 4 and the roller 2, enclosing an angle of which the spindle forms the apex.

By adjustment of the position of the roller 1 the stress in the band 3 may be varied, and by displacing the position of the spindle 4, in combination with such stress, the angle $\alpha$ may be so regulated that spirals and/or rings of desired diameter are produced.

For preparation of the spirals and/or rings there are used strips or webs of relatively rigid, planar material, consisting of a suitable material, e.g. of paper, cardboard, prehardened impregnated paper, plastic, etc., of which a prehardened impregnated paper has major interest. The material from which the spirals and/or rings are to be produced is supplied from plants in the form of rolls, which—by means of a cutting device not covered by the invention—are cut to desired lengths, which are thereafter automatically fed to the top side of the band 3, and the band 3 is passed between the band and the spindle 4 in such manner that it is both flexed and is subjected to stress, whereby a durable deformation to spirals and/or rings is obtained.

Since the spirals and/or rings are formed immediately at the spindle 4 there is placed suitably directly above the band 3 a plate 5, upon which the spirals and/or the rings may roll backwards without the necessity of rolling upon the band 3, which continuously supplies new material. This plate is designated by the numeral 5, and from this plate the spirals and/or rings are passed to a transporting band (not shown), for further transport.

When such a plate 5 is used, the material to be formed into rings and/or spirals is supplied to the device below the plate 5, and the complete spirals and/or rings roll on the upper side of the plate 5.

In order, however, to secure a good rolling-off of the spirals and/or the rings, it is desirable that the portion of the band 3 which is used for feeding in of material, and the plate 5, be arranged in a position inclined downwards from the spindle 4.

Since for the production of spirals and/or rings, material strips or webs of measured lengths are used, the spindle 4 may, by means of suitable devices be, possibly periodically, braked by means of suitable devices. The spindle 4 may, at the first part of the rolling up action, rotate freely, due to the movement of the band 3, but later be braked, so that the last portion of the spiral will get a somewhat sharper curvature than the preceding parts, and thus approach closer to the layer below.

It is of advantage if the band 3 has a greater width than the strip or web of material, which shall form spirals or rings, since thereby also a good deformation of the edge portions of the material is secured.

The speed of propagation of the band 3 over the rollers 1 and 2 may, of course, also be controlled, preferably by one of the rollers being arranged as a driving roller in connection with a motor having adjustable speed range.

Of course the constructional details of the invention may be modified without exceeding the scope of the invention.

We claim:

1. A method of manufacturing curved pieces from lengths of sheet material, comprising passing a carrier band about a member so that said band forms an angle on opposite sides of said member and a spindle is disposed at the apex of said angle, advancing pieces to be curved toward said member on said carrier band, and advancing said pieces between said spindle and said carrier band thereby to impart a curvature to said pieces.

2. A device for manufacturing curved members from pieces of sheet material, comprising an endless band, a pair of rollers about which said endless band is trained, and a spindle above the band adjacent one of the rollers, the band passing under and part way about the spindle and then up over said one roller so that the band on opposite sides of the spindle forms an angle and the spindle is disposed at the apex of said angle.

3. A device as claimed in claim 2, said one roller having a diameter substantially greater than the other said roller.

4. A device as claimed in claim 2, and a plate disposed above said endless band and extending to closely adjacent the spindle, said plate being downwardly inclined from said spindle so that pieces of sheet material emerging from beneath the spindle can roll away from the spindle on the upper surface of the plate.

References Cited

UNITED STATES PATENTS

| | | | |
|---|---|---|---|
| 2,471,447 | 5/1949 | Perkins | 156—589 |
| 3,013,476 | 12/1961 | Anderson | 93—1 |
| 3,347,136 | 10/1967 | Kure | 156—585 XR |
| 3,150,022 | 9/1964 | Vida | 156—73 |

EARL M. BERGERT, *Primary Examiner.*

H. F. EPSTEIN, *Assistant Examiner.*